United States Patent [19]

Uemori

[11] Patent Number: 4,987,442
[45] Date of Patent: Jan. 22, 1991

[54] WIRING DEVICE

[75] Inventor: Satoshi Uemori, Nara, Japan

[73] Assignee: Mita Industrial Co., Ltd., Osaka, Japan

[21] Appl. No.: 429,871

[22] Filed: Oct. 30, 1989

[30] Foreign Application Priority Data

Nov. 8, 1988 [JP] Japan .................. 63-145795[U]

[51] Int. Cl.$^5$ .................. H05K 1/00; G03B 27/50
[52] U.S. Cl. .................. 355/50; 361/398; 174/69
[58] Field of Search .................. 355/50; 361/398; 174/69, 117 F, 117 FF, 268; 354/286, 295, 485

[56] References Cited

U.S. PATENT DOCUMENTS

| 3,551,612 | 12/1970 | Guenter | 174/69 X |
| 4,547,053 | 10/1985 | Tobler | 354/286 X |
| 4,769,669 | 9/1988 | Watanabe | 355/200 |
| 4,864,348 | 9/1989 | Fijiwara et al. | 361/398 X |

FOREIGN PATENT DOCUMENTS 732501 6/1955 United Kingdom .................. 174/69

OTHER PUBLICATIONS

IBM Tech. Disclosure Bulletin, "Flexible Cable", vol. 22, No. 12, May 1980, p. 5303.

Primary Examiner—L. T. Hix
Assistant Examiner—D. Rutledge
Attorney, Agent, or Firm—Jordan and Hamburg

[57] ABSTRACT

A wiring device between a movable member and an immovable member includes an elongated wiring having one of its ends fixed to the movable member and the other of its ends fixed to the immovable member. The wiring has an intermediate generally C-shaped portion and two end portions extending from the C-shaped portion, the C-shaped portion progressively changing its position as one of the end portions elongates and the other end portion shortens as the movable member moves relative to the immovable member. An elongate support has one of its ends fixed to the movable member and the other of its ends fixed to the immovable member, the support having an intermediate generally C-shaped part and two ends parts extending from the C-shaped part, the C-shaped part progressively changing its position as one of the end parts elongates and the other end part shortens as the movable part moves relative to the immovable part. One of the end portions of the wire is generally horizontally disposed. The C-shaped part is spaced from the C-shaped portion and is disposed to underlie the horizontally disposed end portion of the wiring to thereby support the horizontally disposed end portion as the movable member is moved relative to the immovable member.

17 Claims, 7 Drawing Sheets

WIRING DEVICE

BACKGROUND OF THE INVENTION AND RELATED ART STATEMENT

The present invention relates to wiring devices for feeding power or signals, for example, to the optical assembly of image forming apparatus such as analog copying machines, digital copying machines and facsimile systems, or to the printing head of serial printers.

Image forming apparatus such as analog copying machines are heretofore available in which an optical assembly is moved to illuminate and scan a document placed on the document support plate for exposure.

Figure 6:
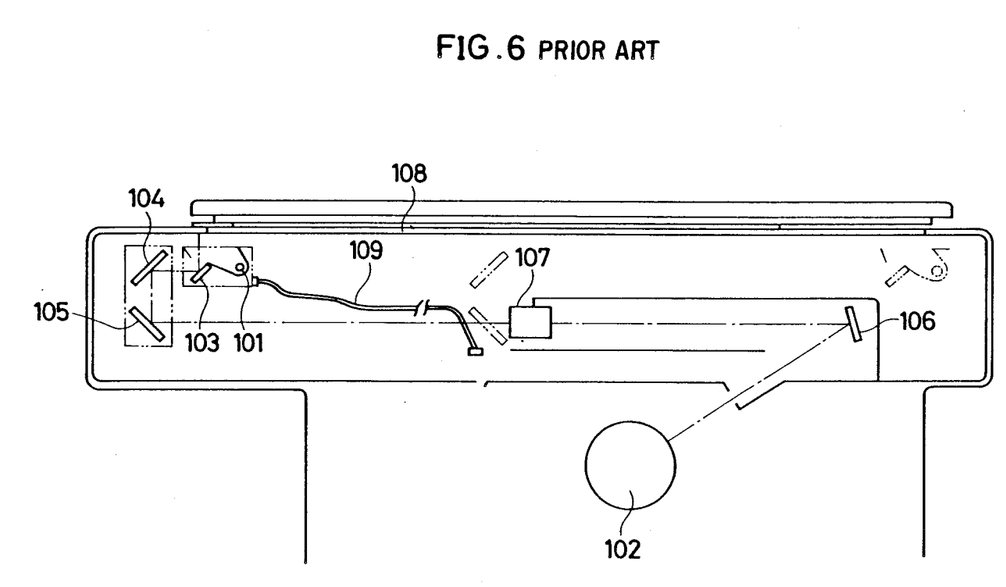
FIG. 6 is a schematic view showing conventional wiring for the optical system of an image forming apparatus.

FIG. 6 shows an optical system including such a movable optical assembly. The system comprises a light source 101 for illuminating documents, and mirrors 103, 104, 105, 106 and a lens 107 for directing the reflected light from the document to a photosensitive member 102. The light source 101 is supported on an unillustrated movable frame and reciprocatingly moved along a document support plate 108. A power supply cable 109 is connected to the light source 101.

However, the cable 109 is thick, heavy and low in flexibility, therefore heavily burdens the movable frame during the movement of the optical assembly and causes vibration of the optical assembly.

Accordingly, a flexible printed wiring board has recently been placed into use instead of the cable 109. The flexible printed wiring board is prepared by printing the desired circuit on a light flexible polyimide film.

Figure 7A:
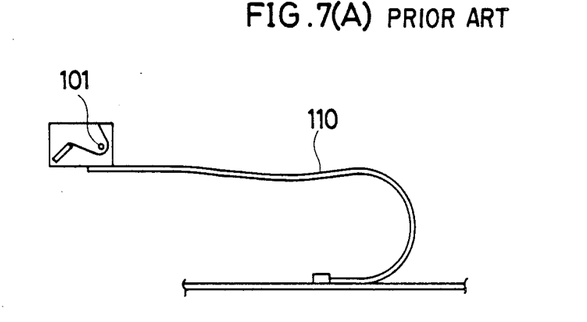

The flexible printed wiring board is indicated at 110 and shown in FIG. 7 (A). The wiring board has one end connected to the movable frame carrying the light source 101, is bent approximately to a U-shape at an intermediate portion, and is fixed at the other end thereof to an immovable portion of the machine body.

Figure 7B:
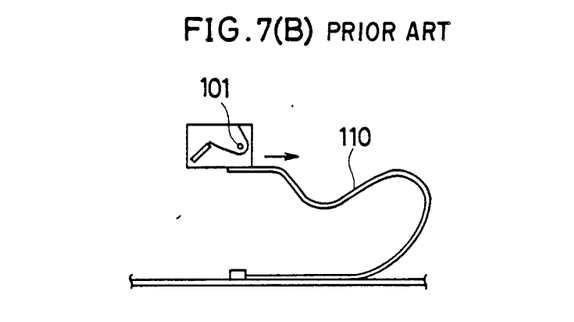
Figure 7C:
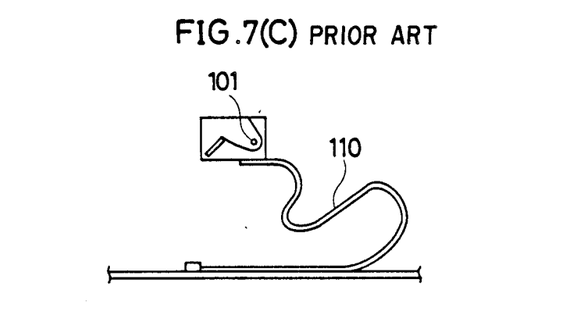

However, when the light source 101 is in the home position (at the left of FIGS. 7 (A), (B) and (C)), the bent portion of the wiring board is away from the light source 101, so that the upper side portion of the board 110 is likely to sag under its own weight as seen in FIG. 7 (B). If the light source 101 moves as indicated by an arrow with the wiring board 110 in such a sagging state, the sagging portion is further bent downward as shown in FIG. 7 (C) to give rise to the problem of imposing an unnecessary burden on the movable frame carrying the light source 101, causing vibration to produce blurred images or possibly causing a break in the printed wiring on the board 110.

The wiring board 110 may be prevented from sagging by increasing the thickness of the board to make it stiffer or by affixing a vinyl chloride sheet or like reinforcement to the entire surface of the board. Nevertheless, this increases the weight of the wiring board 110 itself to give a greater burden to the movable frame or impede stable movement of the frame and other movable optical members such as the mirrors 104 and 105.

These problems are encountered not only with the analog copying machine described above but also with other apparatus wherein the flexible printed wiring board is attached as bent or folded over to a movable member. For example, similar problems are experienced with the flexible printed wiring boards used for the optical systems of digital copying machines or facsimile systems, or the printing heads of serial printers.

SUMMARY OF THE INVENTION

The main object of the present invention is to provide a wiring device which is free of the foregoing problems.

The wiring device of the invention is characterized in that it comprises wiring means connecting a reciprocatingly movable member to an immovable member fixed to a frame supporting the movable member, and support means for supporting the wiring means, the wiring means having one end attached to the movable member, the other end attached to the immovable member, an intermediate bent portion, and a horizontal portion permitting the distance from said one end to the bent portion to vary with the reciprocating movement of the movable member, the support means extending along the wiring means inside thereof and having one end portion attached to the movable member, the other end portion attached to the immovable member, an intermediate bent portion, and a horizontal portion permitting the distance from said one end portion to the bent portion of the support means to vary with the reciprocating movement of the movable member, the horizontal portion of the wiring means being supported by the bent portion of the support means.

When the end of the wiring means attached to the movable member is away from the bent portion thereof, the horizontal portion of the wiring means is supported by the bent portion of the support means in contact with the inner side thereof and can therefore be prevented from sagging.

BRIEF DESCRIPTION OF THE DRAWINGS

FIGS. 3 (A) and (B) are schematic front views showing the relationship between the movable optical assembly of the copying machine and a flexible printed wiring board;

FIGS. 4 (A), (B) and FIG. 5 are schematic front views showing other embodiments of the invention;

FIGS. 7 (A), (B) and (C) are schematic front views showing the relationship between a movable optical assembly and a conventional flexible printed wiring board.

DESCRIPTION OF THE PREFERRED EMBODIMENTS

Embodiments of the invention will be described in detail with reference to the accompanying drawings.

Figure 2:
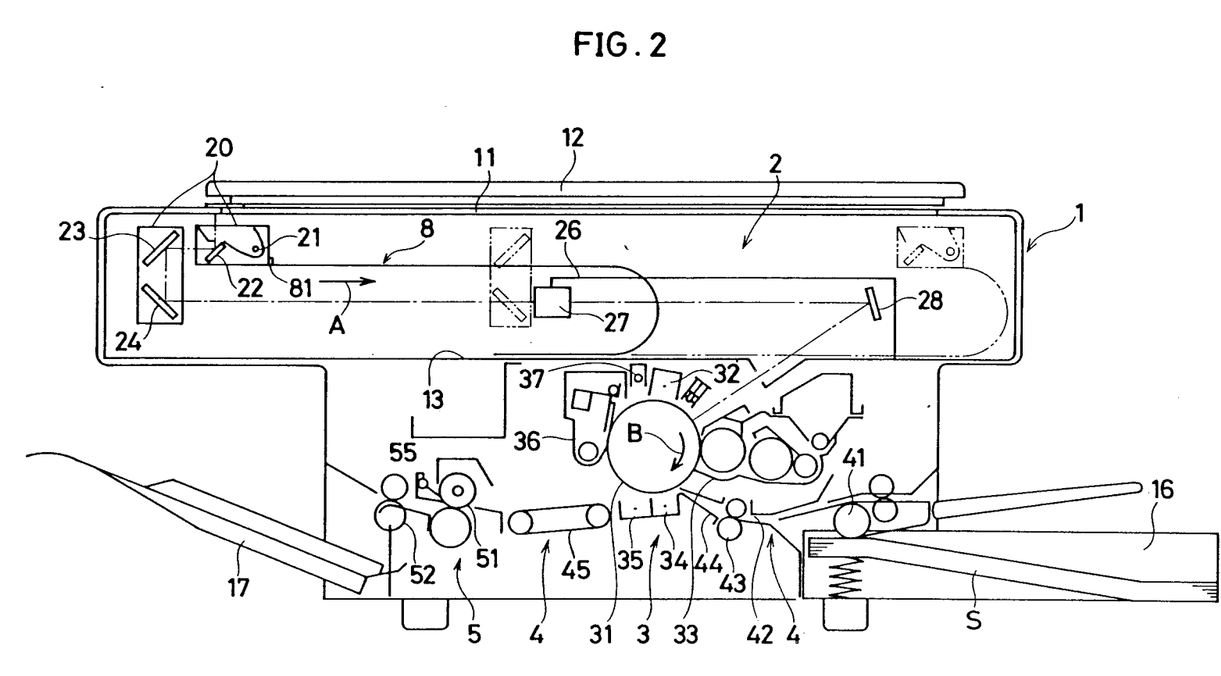
FIG. 2 is a view in section schematically showing the analog copying machine.

FIG. 2 is a schematic view in section of an analog copying machine embodying the invention.

The copying machine has on the top of its body 1 a document support plate 11 in the form of a transparent glass plate, and a document holder 12. An optical system 2 is disposed above a partition 13 provided inside the machine body 1. Arranged below the partition 13 are a copy processing assembly 3, a paper transport system 4 and a heat fixing assembly 5. A paper cassette 16 and a paper tray 17 are arranged respectively at opposite sides of the lower portion of the body 1.

The optical system 2 comprises a light source 21, mirrors 22, 23, 24 and a lens unit. The lens unit is disposed inside a casing 26 attached to the upper side of the partition 13 and comprises a lens 27 and a mirror 28 interposed between the lens 27 and the copy processing assembly 3.

A document placed on the document support plate 11 is illuminated and scanned by moving the light source 21 and the mirror 22 at a predetermined velocity in the direction of arrow A and moving the mirrors 23 and 24 at one-half the velocity of the light source 21 in the same direction. The light reflected from the document is directed to the copy processing assembly 3 via the mirrors 22, 23, 24, the lens 27 and the mirror 28. In the following description, the light source 21 and the mirrors 22, 23, 24 will be referred to collectively as a "movable optical assembly 20."

The movable optical assembly 20 as indicated at the left end in solid lines in FIG. 2 is in its home position. At the two-dot chain line position at the right, the illuminating-scanning operation is completed for the largest copying area. The assembly 20 is reciprocatingly movable between these two positions.

The copy processing assembly 3 comprises a photosensitive drum 31 rotatable in the direction of arrow B, and the components arranged around the drum, i.e. a sensitizing charger 32, developing unit 33, transfer charger 34, separating charger 35, cleaner 36 and eraser lamp 37. The light reflected from the document is projected on the surface of the drum 31 uniformly charged by the sensitizing charger 32 to form an electrostatic latent image on the surface. The latent image is converted to a visible toner image by the developing unit 33, and the toner image is transferred onto paper by the transfer charger 34. The paper bearing the transferred image thereon is separated from the drum 31 by the separating charger 35. The residual toner remaining on the drum 31 after the separation is removed and collected by the cleaner 36. The residual charge is removed from the drum surface by the eraser lamp 37.

The paper transport system 4 has a feed roller 41 for feeding paper sheets S one by one from the cassette 16, feed channel 42, register roller 43 for correcting the leading-end position of the paper when at rest and further forwarding the paper as timed with the leading end of the toner image on the drum 31, feed channel 44, and conveyor belt 45 for transporting the paper separated from the drum 31 by the separating charger 35.

The heat fixing assembly 5 has a heat fixing unit 51 for heat-fixing the transferred toner image to the paper transported by the belt 45, and a discharge roller 52 for delivering the paper onto the paper tray 17.

Figure 1:
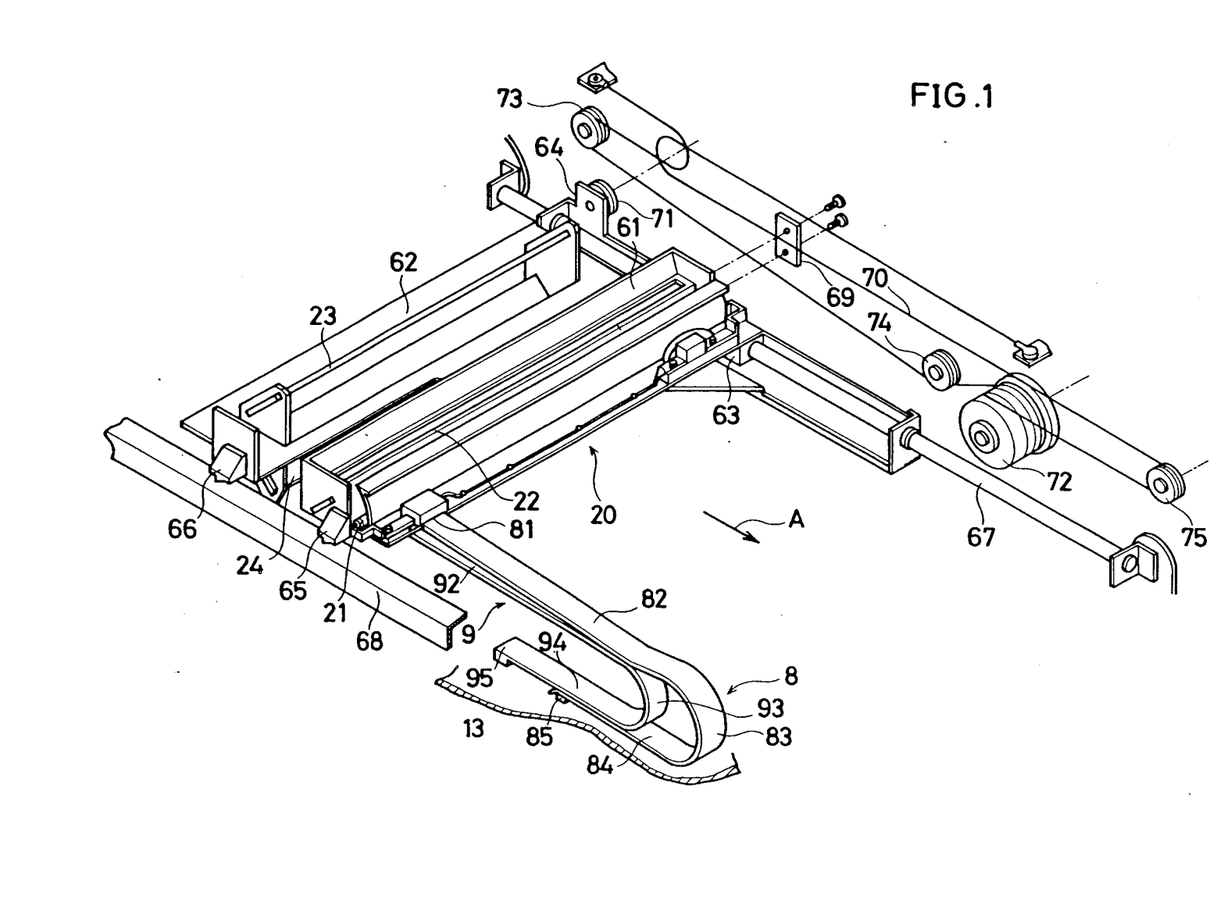
FIG. 1 is a fragmentary perspective view of an analog copying machine having a wiring device of the invention.

Referring to FIG. 1 being a perspective view showing the movable optical assembly 20 in detail, the light source 21 and the mirror 22 constituting the movable optical assembly 20 are mounted on a first movable frame 61. The remaining two mirrors 23 and 24 are mounted a second movable frame 62. The first and second movable frames 61, 62 supported by sliders 63, 64 and slide members 65, 66 on a slide rod 67 and a slide rail 68, whereby the first and second movable frames 61, 62 as held in parallel to each other are moved reciprocatingly in the scanning direction. The first movable frame 61 is fixed to an intermediate portion of a drive wire 70 by a fastening member 69. The second movable frame 62 is attached to the drive wire 70 by a traveling pulley 71. The drive wire 70 is reeved around a drive pulley 72 mounted on a drive motor (not shown), a fixed pulley 73 on the machine body 1, a tension pulley 74 and a fixed pulley 75. The wire 70 has its opposite ends fixed. The drive wire 70 is passed at its one end over the traveling pulley 71, the fixed pulley 73 and the tension pulley 74, wound around the drive pulley 72, reeved around the fixed pulley 75 and then around the traveling pulley 71 again, and fixed in place at the other end thereof. Accordingly, when the drive pulley 72 rotates leftward (counterclockwise), the first movable frame 61 moves rightward (toward the direction of arrow A), and the second movable frame 62 moves toward the same direction at one-half the velocity of the first frame 61. Conversely, when the drive pulley 72 rotates clockwise, the first and second movable frames 61, 62 move leftward and return to the home position.

With reference to FIGS. 1 and 2, a flexible printed wiring board 8 for supplying power to the light source 21 extends along the direction (arrow A) of movement of the first movable frame 61. One end 81 of the wiring board 8 at its upper-side portion is attached to the first frame 61 at one side thereof toward the scanning direction (right side in FIG. 2), the frame 61 being a movable member. The wiring board 8 has the upper-side portion 82, a bent portion 83, lower-side portion 84 and fixed portion. More specifically stated, the upper-side portion 82 continuously and approximately horizontally extends from the above-mentioned one end 81 toward the direction of arrow A along the document support plate 11. The board intermediate portion extending from the portion 82 is arcuately bent downward and folded over to provide the bent portion 83, from which the board 8 further extends continuously horizontally along the partition 13 in a direction opposite to the arrow A to provide the lower-side portion 84. The other end 85 is attached as the fixed portion to the upper side of the partition 13 of the machine body 1.

The length of the flexible printed wiring board 8 is so determined that the bent portion 83 will be positioned rightward from the midportion of the distance of movement of the first movable frame 61. Accordingly, the board 8 can be held connected to the light source 21 at all times even if the first frame 61 moves to the position (two-dot chain line position in FIG. 2) where the illuminating-scanning operation for documents of the largest length is completed.

Figure 3A:
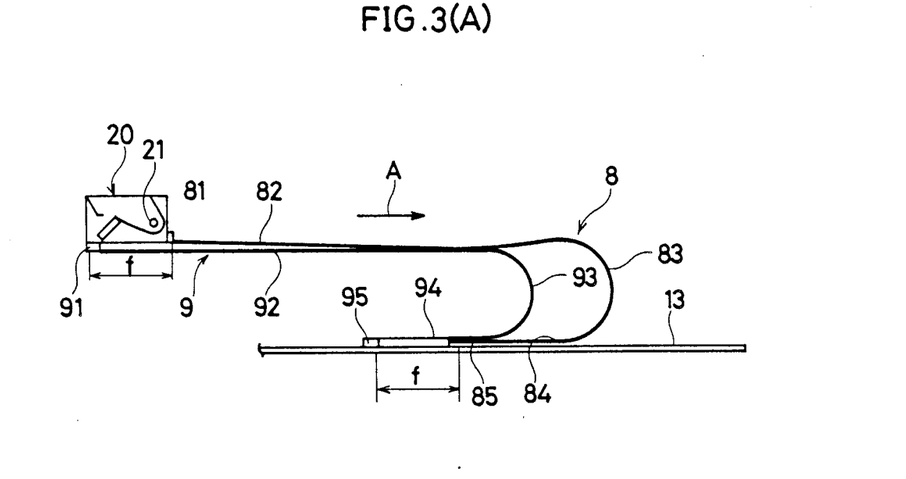

As seen in FIG. 1, a flexible member 9 is disposed inside the wiring board 8, i.e. in the space defined by the lower surface of the upper-side portion 82, the inner surface of the bent portion 83 and the upper surface of the lower-side portion 84. The flexible member 9 has approximately the same length as the board 8, is made of a sheet, such as vinyl chloride film or polyester film, having a thickness, for example, of about 0.125 mm, is flexible and slightly stiffer than the board 8. Like the wiring board 8, one end 91 of upperside portion of the flexible member 9 is attached to the first movable frame 61 as seen in FIG. 3 (A). The position where the member 9 is attached to the frame 61 is a specified distance t away from the wiring board end 81 in a direction opposite to the scanning direction. The flexible member 9 also has the upper-side portion 92, a bent portion 93, lower-side portion 94 and fixed portion. More specifically, the upper-side portion 92 continuously and approximately horizontally extends from the above-mentioned one end 91 toward the direction of arrow A along the upper-side portion 82 of the wiring board 8. The intermediate portion of the member 9 extending from the portion 92 is arcuately bent downward and folded over to provide the bent portion 93, from which the member 9 further extends continuously horizontally along the partition 13 in a direction opposite to the arrow A to provide the lower-side portion 94. The other end 95 is attached as the fixed portion to the upper side of the partition 13 of the machine body 1 and positioned the specified distance t away from the end 85 of the wiring board 8.

Thus, the flexible wiring board 8 and the flexible member 9 are generally U-shaped as arraged horizontally and are displaced from each other by the distance t.

Figure 3B:
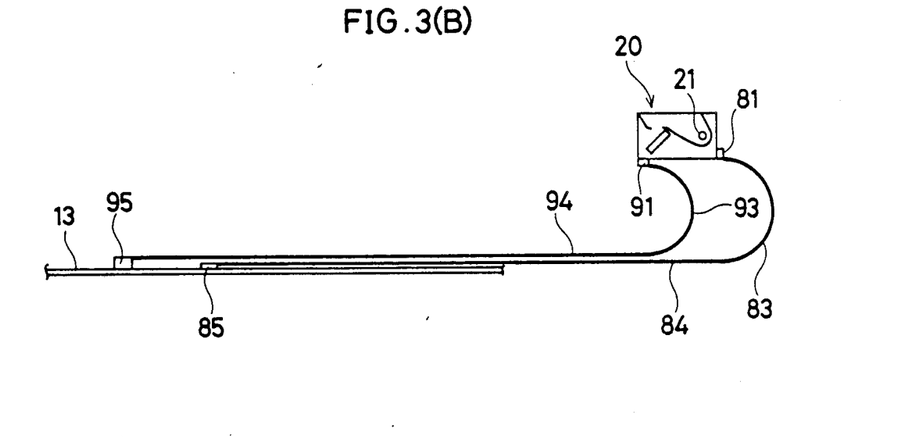

The operation of the present embodiment will be described next with reference to FIGS. 3 (A) and (B).

When the movable optical assembly 20 is in the home position as shown in FIG. 3 (A), the upper-side portion 82 of the wiring board 8 is longer than the lower-side portion 84 thereof. Accordingly, the end 81 of the board 8 attached to the movable optical assembly 20 is away from the bent portion 83. In this state, the intermediate part of the upper-side portion 82 of the board 8 adjacent the bent portion 83 on its assembly (20) side tends to sag under its own weight. However, the bent portion 93 of the flexible member 9 is positioned under the part acting to sag, so that the slightly sagging part of the board upper-side portion 82 is supported by the stiffer bent portion 93 in contact with the lower surface of the sagging part and is prevented from sagging to a greater extent.

When the movable optical assembly 20 is initiated into scanning movement toward the direction A, the bent portion 93 of the flexible member 9 moves while supporting the sagging part of the board upper-side portion 82 by contact therewith. As the assembly 20 moves toward the direction A, the upper-side portion 82 of the board 8 becomes short relative to the lower-side portion 84. Thus, the end 81 of the board 8 attached to the assembly 20 approaches the bent portion 83, eliminating the need for the bent portion 93 to support the upper-side portion 82. In the scanning completed position shown in FIG. 3 (B), the bent portion 93 can be out of contact with the upper-side portion 82.

Figure 4A:
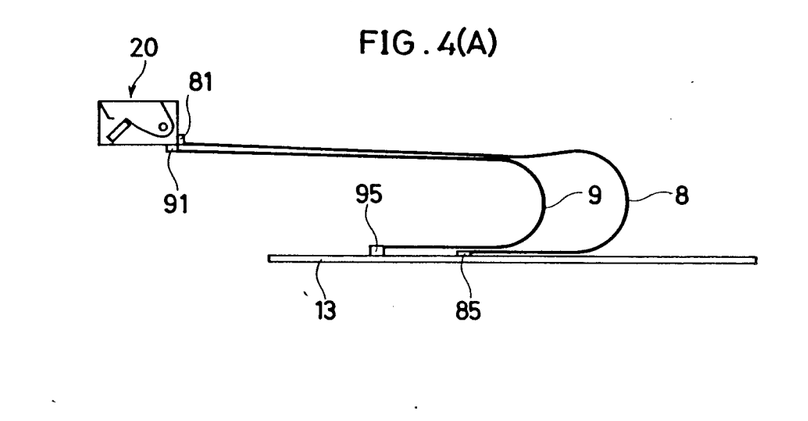
Figure 4B:
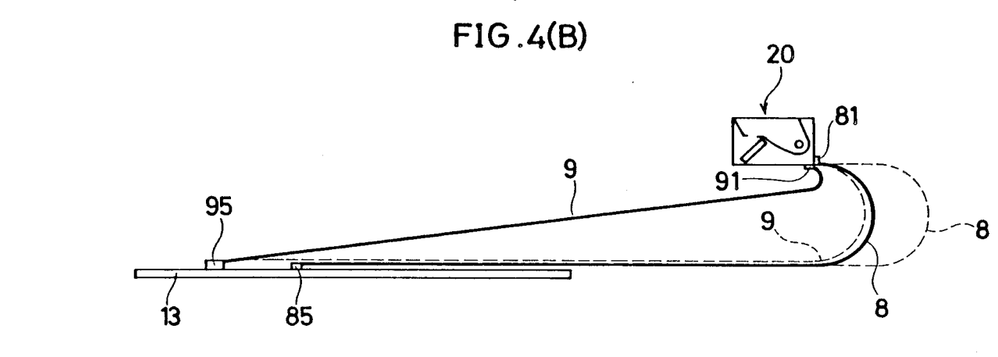

FIGS. 4 (A) and (B) show another embodiment of the invention. Although the ends 81 and 91 are attached, as spaced apart by the distance t, to the assembly 20 in the foregoing embodiment, these ends are attached at the same position to the assembly with the present embodiment. As in the first embodiment, this arrangement also serves to preclude the sag of the upper-side portion 82 of the flexible printed wiring board 8. In this case, however, the flexible member 9 becomes smaller in curvature as shown in FIG. 4 (B), whereas no problem will arise since the flexible member 9 has no wiring. When the flexible member is to be used with a large curvature as indicated in a broken line, this can be realized by making the wiring board 8 longer.

Figure 5:
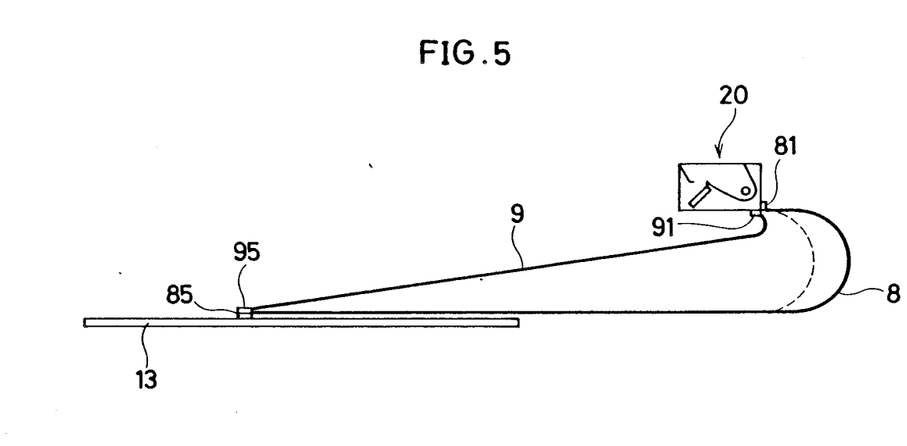

FIG. 5 shows another embodiment of the invention, in which the ends 81 and 91 are arranged at the same position, with the other ends 85 and 95 arranged also at the same position. With this embodiment as in the above embodiments, the upper-side portion 82 of the flexible printed wiring board 8 can be prevented from sagging.

The ends 91 and 95 of the flexible member 9, although fixed according to the above embodiments, can be supported slidably.

The wiring device of the present invention is useful not only for analog copying machines like the foregoing embodiments but is also usable for the optical systems of digital copying machines, facsimile systems and the like. The present device is further usable for supplying power to a reciprocatingly movable member like the one connecting the printing head of a serial printer to the printer body, or for feeding signals to electric devices or the like attached to movable members.

With the arrangement of the present invention wherein one end of a flexible printed wiring board is connected to a movable member, an intermediate portion of the board between the connected end and the bent portion thereof is in contact with and supported by the bent portion of a flexible member while the board end is away from the bent portion of the board, whereby the upperside portion of the board can be prevented from sagging. Moreover, the arrangement described does not involve frictional sliding contact between the flexible wiring board and the flexible member.

Consequently, the movable member can be moved very smoothly free of any undesirable burden or load or vibration and without any likelihood of producing blurred images, hence useful advantages.

What is claimed is:

1. A wiring device between a movable member and an immovable member, comprising an elongated wiring means having one of its ends fixed to said movable member and the other of its ends fixed to said immovable member, said wiring means having an intermediate generally C-shaped portion and two end portions extending from said C-shaped portion, said C-shaped portion progressively changing its position as one of said end portions elongates and the other of said end portions shortens as said movable member moves relative to said immovable member, an elongate support means having one of its ends fixed to said movable member and the other of its ends fixed to said immovable member, said support means having an intermediate generally C-shaped part and two end parts extending from said C-shaped part, said C-shaped part progressively changing its position as one of said end parts elongates and the other end part shortens as said movable part moves relative to said immovable part, one of said end portions of said wire means being generally horizontally disposed, said C-shaped part being spaced from said C-shaped portion and being disposed to underlie said horizontally disposed end portion of said wiring means to thereby support said horizontally disposed end portion as said movable member is moved relative to said immovable member.

2. A wiring device as defined in claim 1 wherein said wiring means is a flexible printed wiring board.

3. A wiring device as defined in claim 1 wherein the support means comprises a flexible member.

4. A wiring device as defined in claim 1 wherein the position where said one end of the wiring means is attached to the movable member is at a specified distance from the position where said one end of the support means is attached to the movable member.

5. A wiring device as defined in claim 1 wherein the position where said other end of the wiring means is attached to the immovable member and the position where said other end of the support means is attached to the immovable member are spaced from each other at the same distance as the distance between the position where said one end of the wiring means is attached to the movable member and the position where said one end of the support means is attached to the movable member.

6. A wiring device as defined in claim 1 wherein the position where said one end of the wiring means is attached to the movable member is the same as the position where said one end of the support means is attached to the movable member.

7. A wiring device as defined in claim 6 wherein the position where said other end of the wiring means is attached to the immovable member is at a specified distance from the position where said other end of the support means is attached to the immovable member.

8. A wiring device as defined in claim 6 wherein the position where said other end of the wiring means is attached to the immovable member is the same as the position where said other end of the support means is attached to the immovable member.

9. A wiring device according to claim 1, wherein said two end portions of said wiring means and said two end parts of said support means are generally horizontally disposed.

10. A wiring device between an immovable member and a movable member comprising a wiring means having a C-shaped portion and two generally horizontally disposed spaced leg portions extending from said C-shaped portion, one of said leg portions being connected to said movable member and the other of said leg portions being connected to said immovable member, a support means having a C-shaped part and two generally horizontally disposed spaced legs parts extending from said C-shaped part, one of said leg parts being connected to said movable member and the other of said leg parts being connected to said immovable member, said two leg parts being disposed between said two leg portions, said C-shaped part being spaced from said C-shaped portion such that said C-shaped part underlies one of said leg portions to provide an underlying support for said one leg portion.

11. A wiring device according to claim 10, wherein said wiring means and said support means have a noncircular cross section and are generally flat.

12. A wiring device according to claim 10, wherein one leg portion of said wiring means is designated an upper leg portion, the other leg portion of said wiring means being designated a lower leg portion, said upper leg portion overlying said lower leg portion, said immovable member having a surface means underlying at least a part of said lower leg portion of said wiring means for supporting said lower leg portion of said wiring means.

13. A wiring device according to claim 10, wherein said leg portions of said wiring means have first and second terminating ends, first connecting means connecting said first terminating end to said movable member and second connecting means connecting said second terminating end to said immovable member, said leg parts of said support means having third and fourth terminating ends, third connecting means connecting said third terminating end to said movable member and fourth connecting means connecting said fourth terminating end to said immovable member, said leg portions of said wiring means being devoid of any connection to said support means between said first and second terminating ends of said wiring means.

14. A wiring device according to claim 13, wherein said first and third connecting means are spaced from one another a distance substantially equal to the spacing between said second and fourth connecting means.

15. A wiring device according to claim 13, wherein said second connecting means is spaced from said fourth connecting means, said first and third connecting means being disposed at the same location on said movable member.

16. A wiring device according to claim 13, wherein said first and third connecting means are disposed at the same location on said movable member, said second and fourth connecting means being disposed at the same location on said immovable means.

17. A wiring device between an immovable member and a movable member comprising a generally U-shaped wiring means having an arcuate portion and two leg portions, one of said leg portions being connected to said immovable member and the other leg portion being connected to said movable member, a generated U-shaped support means disposed between said leg portions of wiring means, said U-shaped support means having an arcuate and two leg parts, one of said leg parts being connected to said immovable member and the other leg part being connected to said movable member, one of said leg portions being generally horizontally disposed, said arcuate part of said support means being spaced from said arcuate portion of said wiring means such that said arcuate part underlies and supports said horizontally disposed leg portion of said wiring means.

* * * * *